United States Patent [19]

Unsworth et al.

[11] Patent Number: 4,862,052
[45] Date of Patent: Aug. 29, 1989

[54] METHOD FOR STOPPING AN ELECTRIC MOTOR

[75] Inventors: Peter J. Unsworth, Lewes, United Kingdom; John C. Merrison; Timothy M. Rowan, both of Wauwatosa, Wis.

[73] Assignee: Allen-Bradley Company, Inc., Milwaukee, Wis.

[21] Appl. No.: 165,538

[22] Filed: Mar. 8, 1988

[51] Int. Cl.[4] .............................................. H02P 3/18
[52] U.S. Cl. .................................... 318/757; 318/763; 318/368
[58] Field of Search ............................... 318/757–762, 318/331, 368, 763, 764, 373, 812, 809, 258, 275

[56] References Cited

U.S. PATENT DOCUMENTS

| | | | |
|---|---|---|---|
| 3,376,485 | 4/1968 | Shibata et al. | |
| 3,569,809 | 3/1971 | Comer | |
| 3,649,894 | 3/1972 | Yoneya | |
| 3,708,734 | 1/1973 | Rowe | |
| 3,795,850 | 3/1974 | Grygera | 318/331 |
| 3,800,202 | 3/1974 | Oswald | 318/368 |
| 4,151,453 | 4/1979 | Suzuki et al. | |
| 4,230,979 | 10/1980 | Espelage et al. | 318/721 |
| 4,238,717 | 12/1980 | Knight et al. | 318/341 |
| 4,374,352 | 2/1983 | Webster | 318/762 |
| 4,390,823 | 6/1983 | Brown et al. | 318/331 |
| 4,392,098 | 7/1983 | Min | 318/758 |
| 4,482,853 | 11/1984 | Bhavsar | 318/778 |
| 4,556,836 | 12/1985 | Antognini | 318/696 |
| 4,581,565 | 4/1986 | Van Pelt et al. | 318/373 |
| 4,612,490 | 7/1983 | Kagi | 318/761 |

OTHER PUBLICATIONS

Smart Motor Controller (SMC) (Bulletin 150).

*Primary Examiner*—David Smith, Jr.
*Attorney, Agent, or Firm*—Quarles & Brady

[57] ABSTRACT

An electric motor is braked by sensing the polarity of voltage of the alternating electricity for powering the motor and sensing the polarity of the voltage induced in the motor by the back electromotive force. When these polarities are opposite the electricity is applied to the motor to generate a braking torque. The application of the electricity is stopped a given interval after it begins to be applied during consecutive voltage cycles. This interval is derived from the time period between when braking commenced to when the electricity was applied during consecutive cycle.

12 Claims, 4 Drawing Sheets

CONTINUOUS FIRING MODE

METHOD FOR STOPPING AN ELECTRIC MOTOR

The present invention relates to the braking of electric motors, and particularly methods for detecting when the motor has stopped.

BACKGROUND OF THE INVENTION

When an electric motor is started, the electric current drawn by the motor can be six times the steady state current once it reaches full speed. Manufacturing equipment and assembly lines often have a number of relatively large three-phase electric motors which start simultaneously thereby placing very large current demands on the electrical distribution system feeding the equipment or assembly line.

In to reduce this start-up current consumption, large alternating current electric motors are often operated by a controller. When the motor is to be started, the equipment operator applies a starting signal to the motor controller. As is well-known, the motor controller then gradually increases the amount of current applied to the motor by regulating the duty cycles of thyristors coupling each phase of electricity to the motor. In doing so, the controller turns on the thyristors initially for only a brief portion of each half-cycle of the A.C. voltage for the corresponding electricity phase. The controller then gradually increases the half-cycle on time of the thyristors until they are constantly turned on at which time the motor is at substantially full speed. This technique reduces the current consumption and torque of the motor during start-up as compared to a hard switching of the full supply line voltage across the motor.

Previous motor controllers often did not provide a mechanism for braking the motor when it was stopped. In response to an operator input to stop the motor, the basic controller simply turns off the thyristors allowing the motor to coast to a stop, slowed only by friction. If the motor is coupled to a mechanical load with considerable inertia, the motor and the load will continue to move for some time after the power is shut off. In many industrial applications of motors, it is important for convenience and efficient use of the driven equipment to stop this continued movement as fast as possible. Merely allowing the motor to coast to a stop often is unsatisfactory. Heretofore, a mechanical brake frequently was coupled to the equipment an engaged when the power was turned off.

As an alternative, a direct current was sometimes applied to the stator windings of an alternating current motor to provide a braking action. In order to electrically brake an alternating current motor, it is necessary to generate a torque in the direction opposite to the direction of the rotation of its rotor. In the direct current braking method of the prior art, the torque is produced by the rotor attempting to rotate in the presence of a steady magnetic field produced by the direct current applied through the stator windings. The rotating direction of the rotor's magnetization leads the direction of the magnetic field produced by the direct current through stator winding. The tendency of the rotor magnetization to align itself with the stator's magnetic field creates an alignment torque which produces a braking effect on the rotor. As is well-known, this torque is equal to the product of the stator magnetic field strength and the rotor magnetization together with the sine of the angle between the two.

Another method of braking the motor involves switching the alternating current to the motor at the proper times to create a magnetic field within the motor which tends to slow the rotor. This technique is described in U.S. patent application Ser. No. 103,729 filed on Oct. 2, 1987 and assigned to the same assignee as the present invention.

One of the problems inherent in any braking technique that applies electricity to the motor, is determining when the motor has stopped so that the application of the braking electricity can be discontinued. Not only is the continued application of the braking electricity inefficient from an energy conservation standpoint, but it may also have adverse effects on the motor.

Heretofore, a timer was often employed for such braking methods with the braking electricity applied for a long enough interval to insure that the motor was stopped. This interval had to be empirically set by the operator for each specific braking application. If the load on the motor varies, thereby affecting the braking time, the interval would have to be set for the worst case, or longest braking interval. This too would be inefficient when the load inertia was small and the motor stopped in a fraction of the worst case interval.

SUMMARY OF THE INVENTION

An alternating current electric motor is stopped by disconnecting the normal electric supply to the motor. Electricity is then reapplied to the motor in a manner which creates a magnetic field within the motor which tends to slow the rotation of the rotor. In the preferred embodiment, the electricity is reapplied whenever the polarity of its voltage is opposite to the polarity of the voltage induced in the motor by the back electromotive force. The reapplication of the electricity becomes more frequent as the motor slows in speed. Eventually, the electricity is applied to the motor during every one of its cycles. This reapplication of electricity continues until the rotor has substantially stopped.

The stoppage of the motor is detected by measuring the interval of time that it takes to slow to the point where the electricity is applied during every cycle to brake the motor. This interval is then employed to derive another interval at the expiration of which the motor is sure to have stopped.

The primary object of the present invention is to determine when an electric motor has stopped.

An object of the present invention is to provide a motor stoppage detection method which compensates for varying inertia of a load connected to the motor.

Another object to detect when an electric motor has stopped by detecting a predetermined pattern in the back emf voltage across the motor winding.

Yet another object of the present invention is to brake an electric motor by applying electricity to it to create a magnetic field which slows the rotor. Such electricity being applied until the motor substantially stops.

DETAILED DESCRIPTION OF THE PRESENT INVENTION

Figure 1:
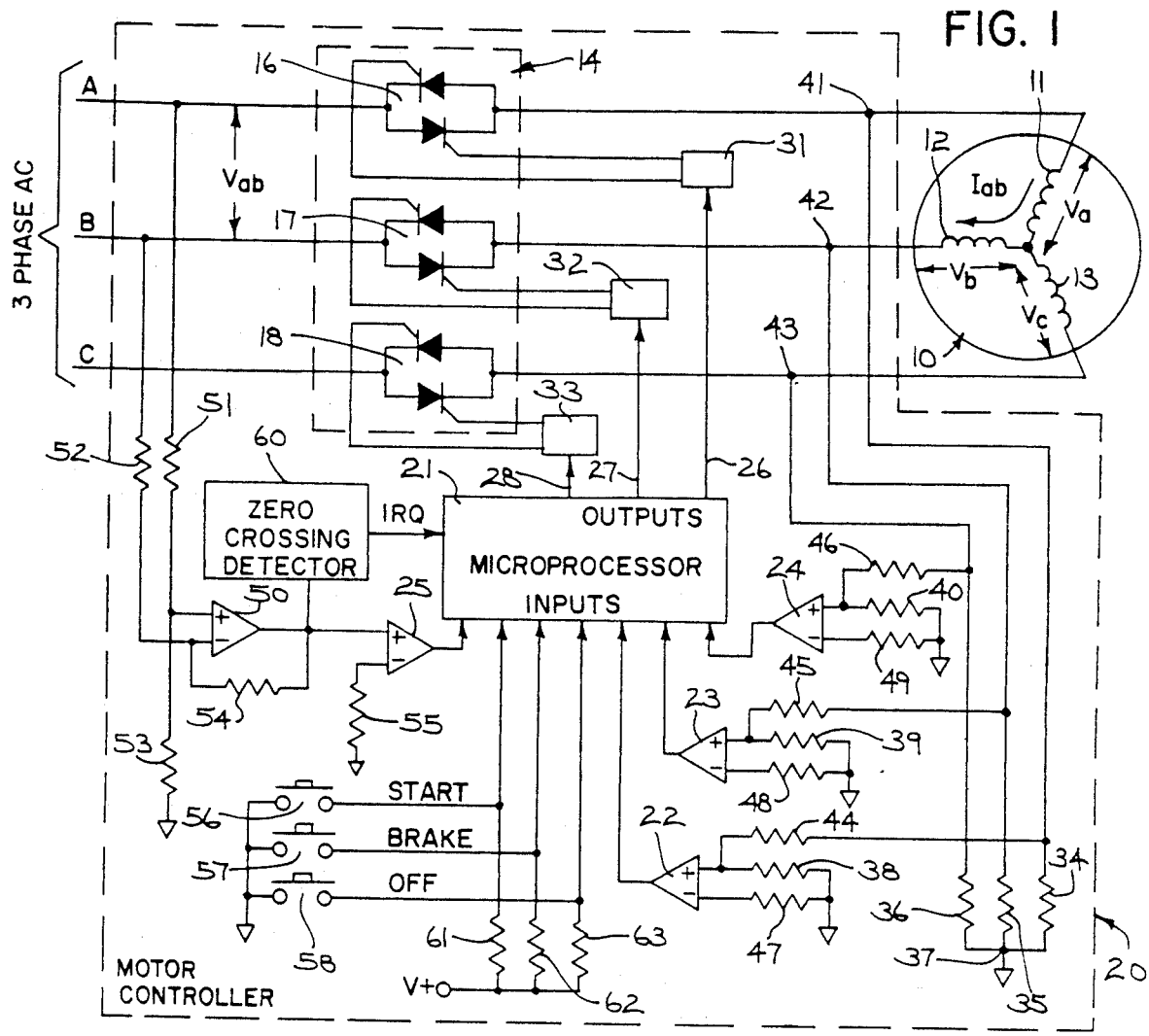
FIG. 1 is a schematic diagram illustrating an electric motor and a motor controller for practicing the present invention.

With initial reference to FIG. 1, a three-phase motor 10 has three windings 11-13. The application of electricity to the motor 10 is controlled by a motor controller 20. The stator windings 11-13 are connected to a source of three-phase alternating electricity by a thyristor switch module 14 and three supply lines designated A, B, and C. The switch module 14 has three pairs of SCR's 16, 17, and 18. The two SCR's in each pair are connected in antiparallel and couple one of the supply lines A, B, or C to one of the three stator windings 11, 12, or 13, respectively.

The SCR pairs 16-18 are triggered, or fired, by a control circuit that includes a microprocessor 21, differential amplifier 50, zero voltage crossing detector 60, and a plurality of voltage comparators 22, 23, 24, and 25. The microprocessor 21 may be a 6801 type manufactured by Hitachi America, Ltd., which also contains a timer circuit, a read only memory, and a random access memory in the same integrated circuit package. The program for controlling the operation of the motor controller 20 is stored in the read only memory. This program is similar to those used with conventional motor controllers insofar as the functions of starting and operating the motor at its normal running speed. As will be explained in detail, the program contains a novel routine for braking the motor 10 to a stop.

The microprocessor 21 generates properly timed thyristor trigger signals on three lines 26, 27, and 28 of a parallel output port. The first output line 26 is coupled by a first conventional isolation transformer 31 to the gate terminals of the first pair of SCR's 16 for electricity supply line A. The other trigger output lines 27 and 28 are coupled by isolation transformers 32 and 33 to the gate terminals of second and third SCR pairs 17 and 18, respectively, for electricity supply lines B and C.

The terminals 41, 42, and 43 of each of the three motor stator windings 11-13 are coupled to separate, equal value resistors 34-36 in a Y connection with the neutral node 37 of the Y connected to the ground of the braking circuit. The voltage across each of the resistors 34, 35, and 36 equals the voltage Va, Vb and Vc across each of the three stator windings 11, 12, and 13, respectively. The polarity of the voltage across each of the stator windings 11-13 is sensed by three of the voltage comparators 22, 23, and 24. The non-inverting input of each of these voltage comparators 22, 23, and 24 is coupled by a voltage dropping resistor 44, 45, or 46 to one of the stator winding terminals 41, 42, or 43. Each of the non-inverting inputs is also coupled to the circuit ground by a resistor 38, 39, or 40, thereby forming voltage dividers with resistors 44, 45 and 46 to reduce the motor stator winding voltages to levels compatible with the comparators 22, 23 and 24. The inverting input of each of these three voltage comparators is coupled by a resistor 47, 48, and 49 to the circuit ground. The outputs of the three comparators 22, 23, and 24 are connected to three lines of a parallel input port of the microprocessor 21.

The A and B supply lines are separately coupled by resistors 51 and 52, respectively, to the non-inverting and inverting inputs of a differential amplifier 50. The non-inverting input is also coupled to the circuit ground by resistor 53. A feedback resistor 54 is connected between the output of the differential amplifier 50 and its inverting input. The output of the differential amplifier 50 also is connected to the non-inverting input of the fourth voltage comparator 25 whose inverting input is coupled to ground by resistor 55. The output of the fourth voltage comparator 25 is connected to another line of the microprocessor parallel input port. The level of this input indicates the polarity of the voltage Vab across the A and B supply lines. The output of the differential amplifier 50 is further connected to a zero crossing detector 60 which senses when the voltage output of the differential amplifier, and hence the voltage Vab across supply lines A and B, goes through zero volts. The output signal from the zero crossing detector 60 is connected to an interrupt input (IRQ) of the microprocessor 21.

Additional input port lines of the microprocessor 21 are connected to manual pushbutton switches 56, 57, and 58. These additional input port lines are also coupled by three pull up resistors 61-63 to the positive voltage supply for the motor controller 20. Activation of these switches 56-58 pulls the corresponding microprocessor input line to ground. The first switch 56 is activated to start the motor 10. The second switch 57 initiates the braking function while the third switch 58 causes the electricity to the motor 10 to be disconnected.

The microprocessor 21 executes a conventional program for starting and controlling the normal running of the motor 10. However, the improved motor controller 20 offers the operator two methods for stopping the motor. By pressing pushbutton switch 58, the motor controller discontinues applying trigger pulses to gates of the SCR's in the switch module 14. As a result, electricity is no longer applied to the motor and it coasts to a stop.

However, merely allowing the motor 10 to coast to a stop may be unsatisfactory when the motor is coupled to a load with large inertia. In this situation, it may take several minutes for friction to stop the motor. In order to stop the motor quicker, the operator depresses pushbutton switch 57 which initiates the braking function of the motor controller 20. The activation of the brake pushbutton switch 57 pulls the corresponding input of the microprocessor 21 to ground. In response thereto, the microprocessor begins executing a software routine which brakes the motor faster than simply disconnecting the electricity.

The braking technique involves applying current pulses to the motor 10 at times which will generate an electromagnetic field that slows the motor's rotor. It has been determined that this can be achieved by applying the alternating electricity when the polarity of its instantaneous voltage is opposite to the polarity of the back electromotive force (emf) induced voltage of the motor (i.e. one of these voltages is positive and the other is negative). The back emf induced voltage results from the decaying magnetism of the rotor which produces a rotating magnetic field as the rotor slows. Specifically referring to FIG. 1, the back emf induced voltage Vc across the third stator coil 13 is sensed by the third voltage comparator 24. The output of the third voltage comparator represents the polarity of the sensed back emf induced voltage. The polarity of the alternating supply voltage Vab across lines A and B is sensed by the fourth voltage comparator 25. After each zero voltage crossing of the A-B supply voltage, the microprocessor 21 examines the polarity of the two sampled voltages, if the polarities are opposite, the pairs of SCR's 16 and 17 for the A and B supply lines are fired by a short pulse applied to the SCR gate electrode after a fixed delay from the occurrence of the zero crossing. The delay can be up to one half the period of the supply voltage. The shorter the delay the greater the braking effect. The fixed SCR's 16 and 17 apply current to the motor until the alternating current passes through zero amps, at which point the SCR's turn off.

Figure 4:
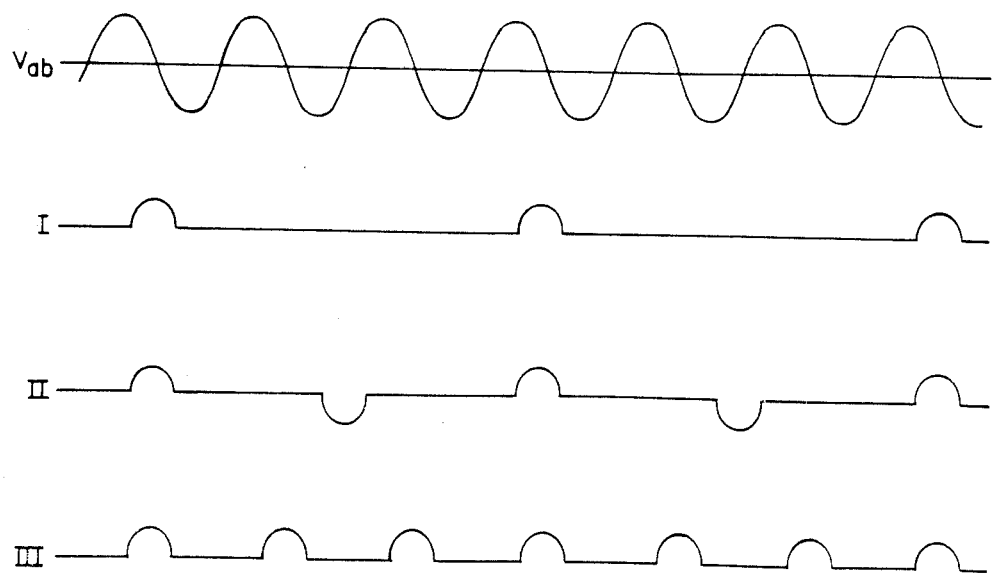
FIG. 4 is a conceptual illustration of the waveforms of the voltage of one phase of the AC power and the current applied to brake the motor at three speeds as the motor slows.

As the motor 10 slows down, the phase relationship between the back emf voltage Vc and the supply line voltage Vab changes. As a result, the pairs of SCR's 16 and 17 are triggered more and more frequently thereby increasing the braking force. This is conceptually illustrated in FIG. 4. Waveforms I, II and III of FIG. 4 represent the current Iab that flows through the first and second stator windings 11 and 12 at three progressively slower speeds during the braking. In waveform I, the first and second pairs of SCR's 16 and 17 are triggered only during an occasional positive half-cycle of the supply line voltage Vab. As the motor slows, additional triggering occurs during occasional negative half-cycles between the positive half-cycle triggering as shown by waveform II. It should be understood that the number of cycles of the supply line voltage Vab between the SCR triggering depicted in waveforms I and II is significantly greater than that illustrated. Continued slowing of the motor results in the SCR's being triggered during every cycle of the line voltage Vab as illustrated by waveform III. The triggering of the SCR's during every cycle provides an indication that the motor has slowed to approximately thirty percent of its full normal running speed prior to braking. The triggering can occur during each positive or negative half-cycle. Additional SCR trigger patterns occur between those illustrated in FIG. 4.

The present invention is an improvement to this braking technique and provides a method for detecting when the motor has stopped so that the triggering of the SCR's can be discontinued. The method initially senses when the SCR's are being fired during every cycle of the alternating supply voltage. At this time, the motor 10 has slowed to approximately thirty percent of its named running speed prior to braking. When this occurs, the back emf voltage across each of the stator coils 11–13 is sampled every cycle just prior to firing the SCR pairs 16 and 17. Thereafter, the pattern of back emf samples will remain unchanged until just before the motor stops. Therefore, when a change in this pattern is detected, the triggering of the SCR's for braking can cease allowing the motor to coast to a stop, or preferably continued for an additional fixed interval (e.g. one second).

A safeguard is provided to prevent the SCR triggering from continuing in the event the motor stops before the predetermined number of consecutive back emf voltage polarity patterns occurs. This is accomplished by measuring the time that it takes for the motor to slow to the point at which the SCR's are being triggered during every cycle of the supply voltage. Thereafter, if the application of the braking current does not terminate as described above within another equal period of time, it is assumed that the motor has stopped and the SCR triggering ceases.

Figure 2A:
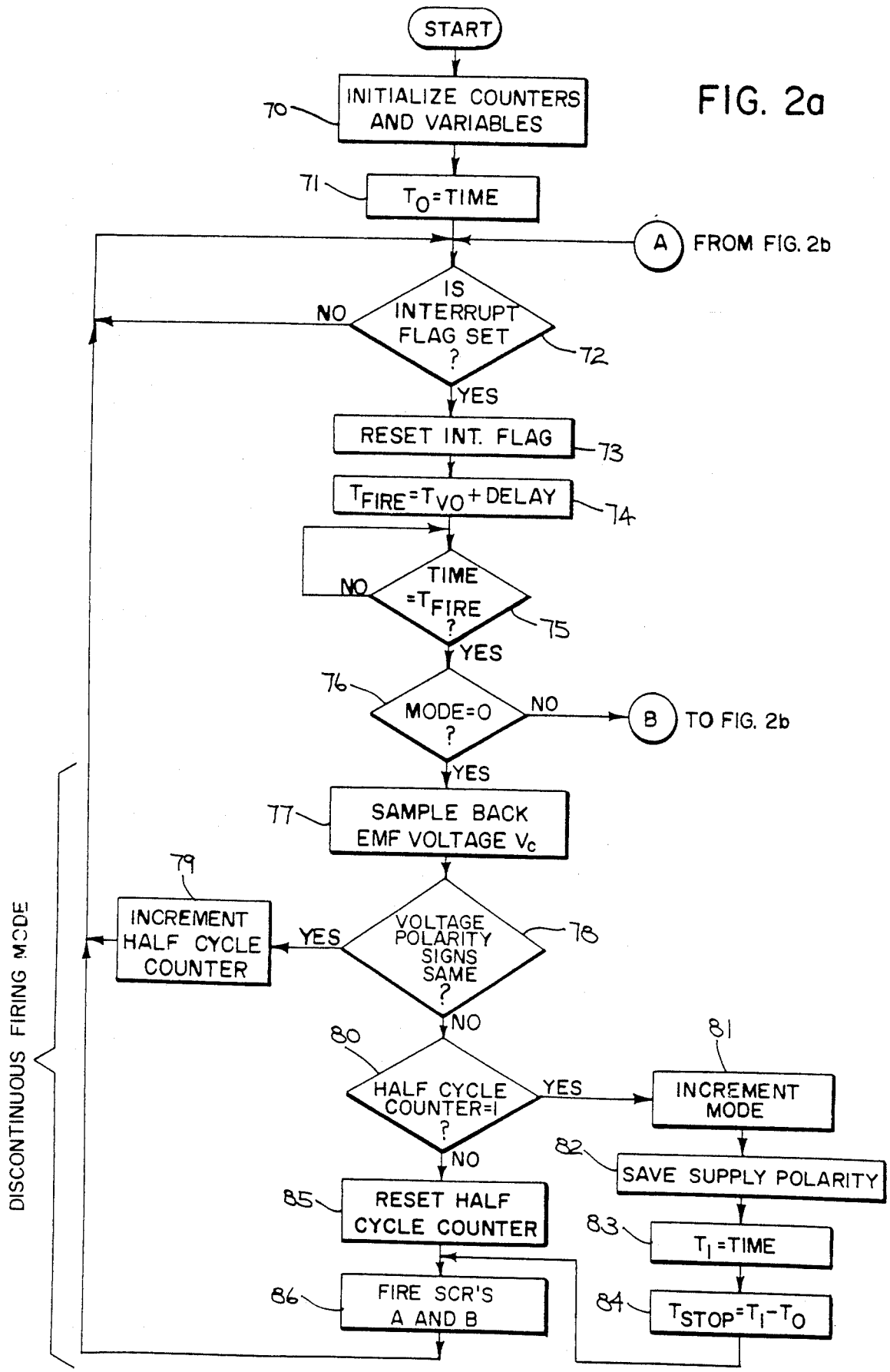
FIGS. 2a, b, and c are a flow chart of the braking technique program according to the present invention.

The present invention is implemented in a microprocessor based motor controller 20, such as illustrated in FIG. 1. The software routine for braking the motor begins at step 70 on FIG. 2a by the microprocessor 21 initializing the addresses in its memory that contain the values of the variables and counters used in the routine. The value of the microprocessor timer when the braking is commenced is saved as time $T_o$ at step 71. Once the initialization is complete, the microprocessor 21 checks an interrupt flag at step 72. If this flag is not set, the programs loops continually checking the flag.

Figure 2B:
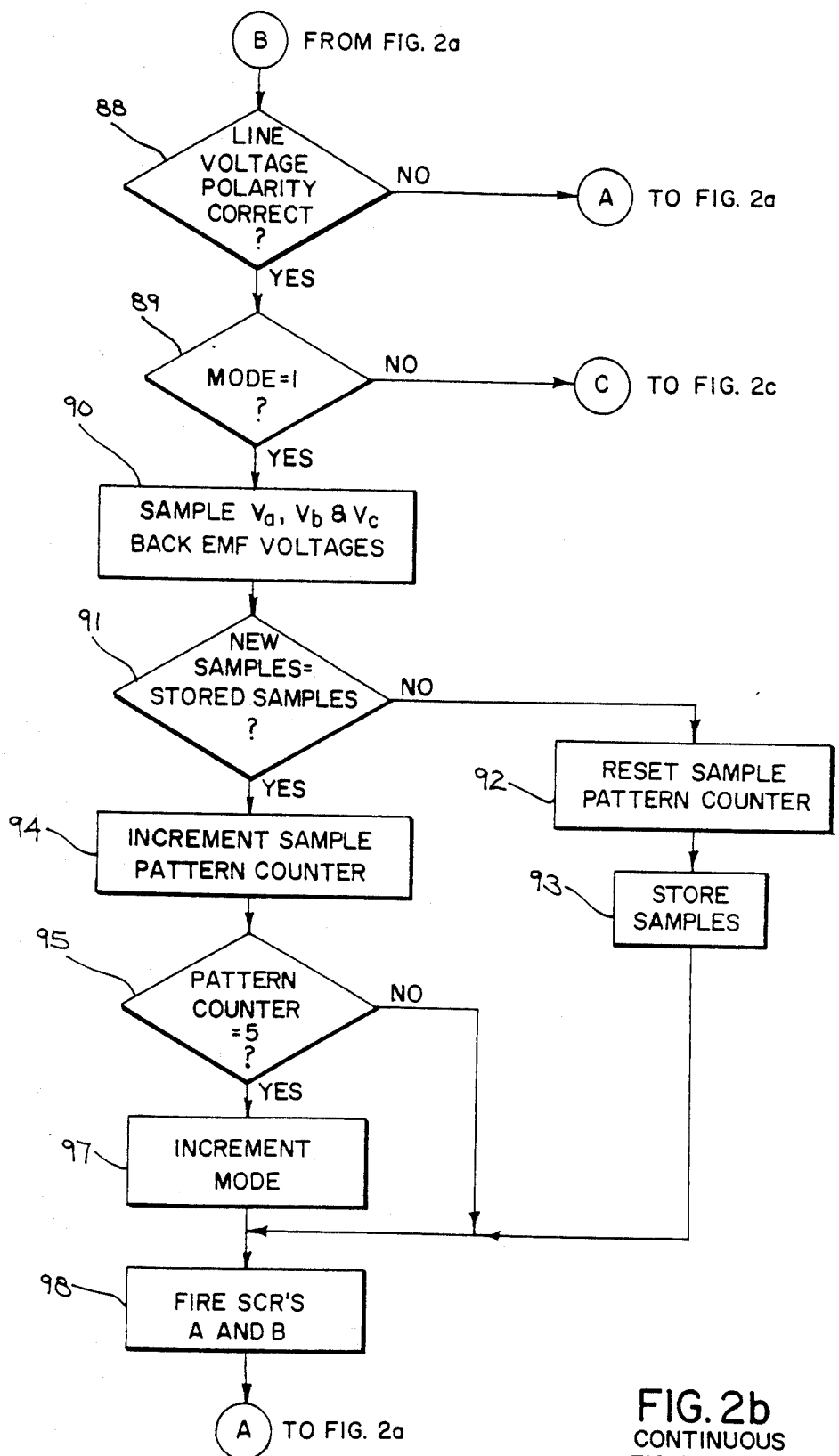
Figure 2C:
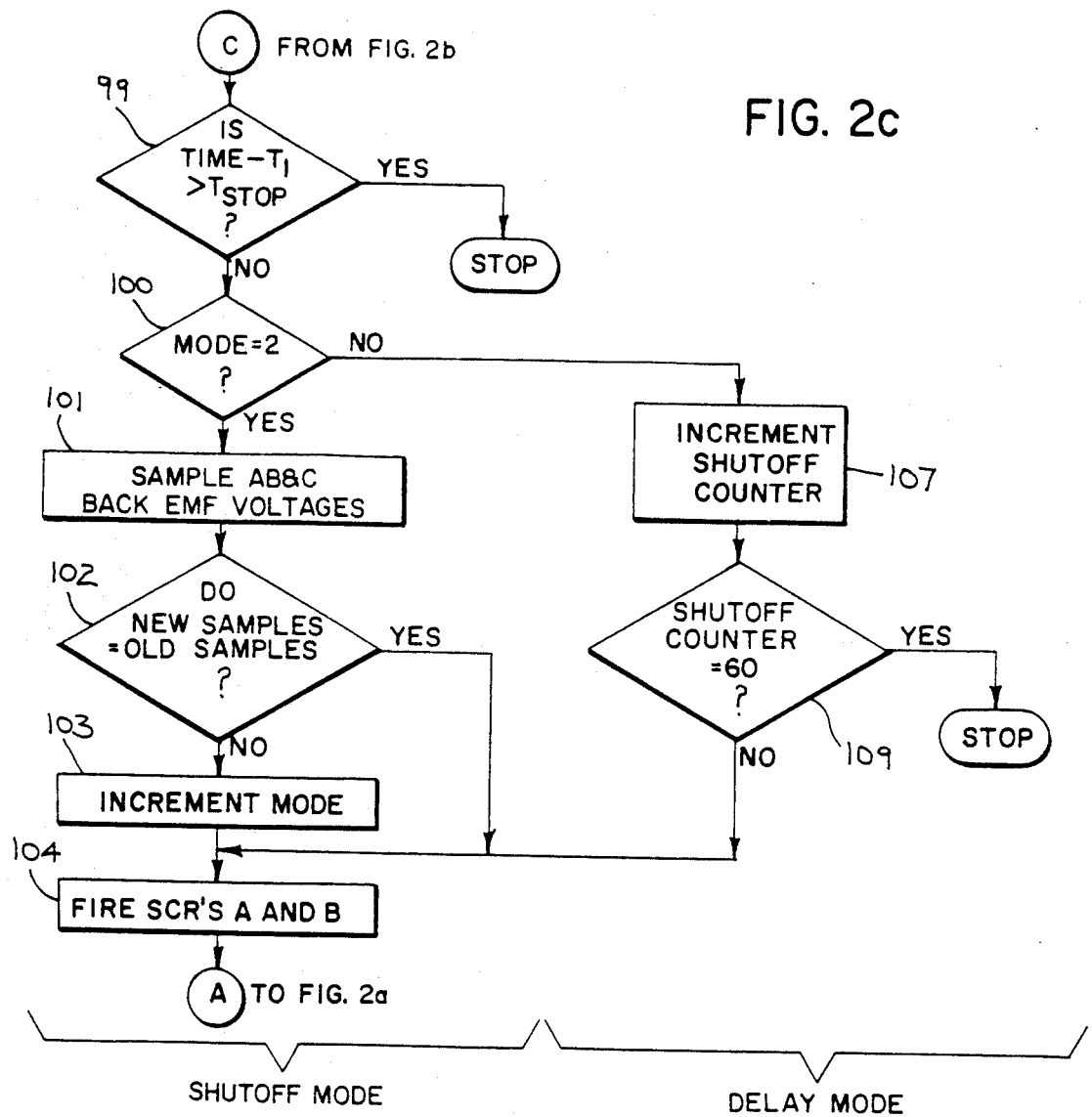
Figure 3:
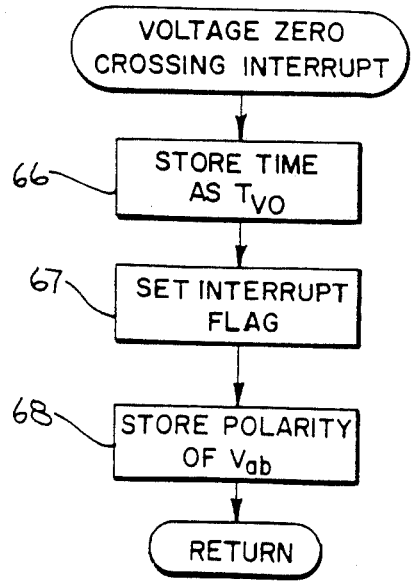
FIG. 3 is a flow chart of the voltage zero crossing interrupt routine for the motor controller.

The flag is set by an interrupt routine illustrated in FIG. 3. The interrupt routine is executed whenever the zero crossing detector 60 senses a zero crossing of the voltage Vab across the A and B supply lines. Whenever this occurs, the microprocessor 21 is interrupted and, at step 66, loads the value of its timer in a memory location designated to store the time of the zero crossing $T_{vo}$. The interrupt flag is set at step 67 and the new polarity of the voltage across the A and B supply lines as sensed by the fourth comparator 25 is stored in the microprocessor memory at step 68. The interrupt routine then ends by returning to the step of the flow chart in FIGS. 2a–c that was being executed when the interrupt occurred.

Referring again to FIG. 2a, when the setting of the interrupt flag is sensed at step 72, the flag is reset at process block 73 and the program execution advances to step 74. A delay interval constant is added to the stored zero crossing time $T_{vo}$ to determine the time ($T_{Fire}$) at which fire the SCR's for motor braking. The delay interval constant is preset and determines the magnitude of the braking. The shorter the delay the stronger the braking force. The current value of the microprocessor timer then is compared to the firing time $T_{Fire}$ at step 75. If it is not time to fire, the program loops until it is the proper time.

At that proper time, the program exits the loop and determines whether the operation mode indicator variable designates the discontinuous firing mode (Mode=0). In this mode of operation, the first and second pairs of SCR's 16 and 17 are not as yet being fired during every cycle of the voltage Vab across the A and B supply lines. As noted previously, when the braking begins, the SCR pairs 16 and 17 are fired only once every several cycles of the supply voltage. Therefore, initially the braking system will be in the discontinuous firing mode.

During this mode of operation, the program advances to step 77 where the microprocessor 21 examines the input level from the third voltage comparator 24 representing the polarity of the back emf voltage Vc induced across the third stator coil 13. At step 78, the microprocessor 21 compares the polarity of the sensed back emf voltage Vc to the polarity of the voltage Vab across supply lines A and B. If these polarities are the same, that is the voltages are both in their positive or negative half cycles, a counter which tabulates the half cycles of the supply voltage Vab between SCR firings is incremented at step 79. Then, the program execution returns to step 72 to wait for another zero crossing.

As explained above, the first and second SCR pairs 16 and 17 are fired to generate a braking force only when the back emf induced voltage Vc and the supply line voltage Vab are opposite in polarity. When this condition is detected by the microprocessor 21 at step 78, a determination is made at step 80 of whether these pairs of SCR's are being fired during every cycle of the supply line voltage. The first and second SCR pairs 16 and 17 are being fired every cycle when only one half cycle of the supply voltage occurs between SCR firings. This is indicated by the half cycle counter having the value of one when it is read at step 80. When the SCR pairs are firing every cycle, the program should enter the continuous firing mode. The mode change is designated by incrementing the mode indicator at step 81. Next, the polarity of the supply voltage Vab is stored in memory at step 82. Then the current value of the microprocessor timer is saved as time $T_1$ at step 83. The time interval, designated $T_{stop}$, between the starting of the braking and when the motor slowed to approximately thirty percent of its full speed is calculated by subtracting $T_0$ from $T_1$ at step 84. The program then advances to step 86 where the pairs of SCR's 16 and 17 for the A and B supply lines are fired.

If the two pairs of SCR's are not being fired during every voltage cycle, the half cycle counter is reset at step 85 before advancing to step 86. At step 86 trigger pulses are sent on output lines 26 and 27 of the microprocessor 21 to trigger the gates of the first and second pairs of SCR's 16 add 17 connected to the A and B supply lines. The triggering of these SCR pairs 16 and 17 sends a current Iab through the first and second stator coils 11 and 12. This current generates an electromagnetic field that interacts with the magnetism of the rotor to slow the rotor. Once the SCR's have been triggered by a short pulse, the program execution returns to step 72 to await another zero crossing of the voltage across supply lines A and B.

Eventually the motor will slow down to approximately thirty percent of its normal running speed prior to the initiation of the braking. At this point the SCR's begin to fire during every cycle of the supply line voltage, either during every positive or negative half cycle. This event is detected at step 80 and the mode indicator is incremented (Mode=1) to designate that the continuous firing mode has been entered.

Thereafter the program execution branches every time from decision block 76 to the first step 88 of the continuous firing mode branch on FIG. 2b. This branch fires the first and second SCR pairs 16 and 17 during every cycle of the supply line voltage Vab and detects when identical patterns of back emf induced voltage polarity samples occur for five consecutive cycles. At the beginning of this branch of the motor braking routine, the voltage Vab across the A and B supply lines is checked to determine if it is the proper half cycle in which to fire the SCR pairs 16 and 17. This is accomplished by comparing the polarity of the present supply line voltage to the polarity of the supply line voltage that was stored at step 82 when the system began firing the SCR's during every voltage cycle. If it is not the proper half cycle, i.e. the two polarities are not identical, the program returns to step 72 to wait for the next zero voltage crossing.

Upon the occurrence of the next zero crossing, the program will advance from step 76 to step 88 at which time the current supply voltage polarity should equal the stored polarity. The mode indicator is then checked at step 89 and the first time through this branch it will equal one indicating the continuous mode. As a consequence, the execution will advance to sample the polarity of the back emf voltages Va, Vb and Vc induced across each of the three stator coils 11–13 at step 90. In doing this the microprocessor 21 examines the input bits from the first three voltage comparators 22, 23, and 24. The pattern of the three back emf voltage polarities is then compared at step 91 to a pattern stored in the microprocessor memory. Normally the stored pattern is the one sampled during a previous cycle. However, the first time through this program branch, the sampled pattern is compared to a default pattern stored during program initialization.

If the two compared patterns are not equal, a sample pattern counter in microprocessor memory is reset at step 92. The sample pattern counter keeps track of during how many consecutive cycles of the supply line voltage, the same pattern of back emf voltage polarities occurs. After this counter has been reset, the three polarity samples are stored at step 93 and the program advances to step 98 where the two SCR pairs 16 and 17 are fired.

If at step 91 the comparison of the two sets of back emf induced voltage polarities indicates identical patterns, the sample pattern counter is incremented at step 94. Then the microprocessor 21 checks the new value of the sample pattern counter to detect if the same back emf voltage polarity patterns have occurred for five consecutive supply voltage cycles. However, the present invention may be implemented by detecting the occurrence of the same pattern for a greater or lesser number of cycles. If the same pattern of three polarity samples is found for five consecutive supply voltage cycles, the first counter will equal five and the mode indicator will be incremented at step 97 to designate that the shutoff mode should be entered. If the sample pattern counter value is less than five the program will jump around the mode incrementation step 97 and fire the pairs of SCR's 16 and 27 for supply lines A and B. Once the SCR's have been fired, the program execution returns to step 72 to await another zero voltage crossing.

The program execution continues to loop through the continuous mode branch until five consecutive identical back emf voltage polarity patterns are found. Once five consecutive patterns are found, the next time through the branch, the mode indicator will have the value two and the program will advance from decision block 89 to the first step 99 of the shutoff mode branch. At this juncture, the time $T_1$ at which the SCR pairs 16 and 17 began to be fired during every cycle of the supply line voltage Vab is subtracted from the current timer value and the result is compared to interval $T_{stop}$. If the computed interval exceeds $T_{stop}$, the braking process terminates. It takes the motor less time to go from thirty percent full speed at time $T_1$ to a stop than it took to slow to thirty percent full speed. Therefore, if the test at step 99 is positive, the motor stopped before five consecutive identical polarity patterns occurred. This time interval check provides a safeguard against the braking process continuing indefinitely. Alternatively, a similar safeguard can be provided by discontinuing the braking a fixed interval after time $T_1$. This can be implemented by subtracting time $T_1$ from the current time and comparing the result to a constant value at step 99.

Next at step 100, the mode is checked again and if it equals 2 the execution advances to detect a change in the back emf voltage polarity pattern. Initially the program will advance to step 101 where the back emf voltage polarities from the first three voltage comparators 22-24 are sampled. These new samples are compared at step 102 to the samples previously stored in memory at step 93. The comparison is to detect when the sample pattern changes, and when it does, the mode indicator is incremented at step 103. At this time, the motor 10 has slowed to less than thirty percent of the speed prior to braking. The pattern of the back emf voltage polarities samples for the three stator coils 11-13 now will remain the same until just before the motor is to stop. At which point one or more of the polarities will change. Therefore, the program execution continues to loop through the shutoff mode branch, steps 100–104, until a polarity change is detected at decision block 102. When this occurs, the mode indicator is incremented at step 103 to the value three before firing the SCR's at step 104.

The next time that the SCR's are to be fired, the program execution branches from step 100 to the delay mode at step 107. This phase of the braking routine continues to fire the first and second SCR pairs 16 and 17 for the A and B electricity supply lines every cycle for a predetermined interval. In the preferred embodiment, this interval is one second, or sixty cycles of the 60 Hz AC electricity. Although this one second interval appears to be satisfactory to bring the motor to a full stop, it can be varied within the context of the present invention.

The delay mode branch begins at step 107 where a shutoff counter memory location is incremented. The shutoff counter value is then examined at step 108 to determine if the delay mode branch has been executed for 60 cycles of the supply electricity. If the shutoff counter is less than 60, the first and second shutoff SCR pairs 16 and 17 are again fired at step 109. When the shutoff counter reaches 60, the program ends and the SCR firing ceases.

We claim:

1. A method for braking an electric motor in response to a brake signal comprising the steps of:
   sensing the polarity of the voltage from a source of alternating electricity;
   sensing the polarity of the back emf voltage from the motor;
   applying electricity from the source to the motor in a manner which tends to slow the rotation of the motor, the application of electricity being in response to the voltage from the source and the back emf voltage being of opposite polarities;
   stopping the application of the electricity to the motor a given interval after the electricity is applied to the motor during consecutive cycles of the source voltage.

2. The method as in claim 1 further comprising:
   measuring the time interval between when the brake signal occurs and when the electricity is applied to the motor during consecutive cycles of the alternating voltage; and
   deriving the given interval from the measured interval.

3. The method as recited in claim 1 wherein the given interval is a fixed amount of time.

4. The method as recited in claim 1 further comprising deriving the given interval from the period between a first point in time determined from when the brake signal commenced until a second point in time determined from when the electricity was applied during every cycle.

5. A method for braking an electric motor in response to a brake signal comprising the steps of:
   sensing the polarity of the voltage from a source of alternating electricity;
   sensing the polarity of the back emf voltage from the motor;
   applying electricity to the motor in a manner which tends to slow the rotation of the motor, the application of electricity being in response to the voltage from the source of alternating electricity and the back emf voltage being of opposite polarities;
   determining when the motor reaches a given speed; and
   stopping the application of electricity to the motor after a period of time from when the motor reached the given speed.

6. The method as recited in claim 5 wherein said given speed is in the range of 0 to 50 percent of the normal running speed of the motor.

7. The method as recited in claim 5 further comprising measuring the time interval from when the brake signal commenced until the motor reaches the given speed; and wherein the period of time is derived from the measured time interval.

8. The method as recited in claim 7 wherein the period of time is substantially equal to the measured time interval.

9. The method as recited in claim 5 further comprising determining when the motor reaches the given speed using the sensed polarity of the back emf voltage.

10. A method for braking an alternating current electric motor in response to a brake signal comprising the steps of:
    sensing the polarity of the voltage from a source of alternating electricity;
    sensing the polarity of the back emf voltage from the motor;
    applying electricity to the motor in a manner which tends to slow the rotation of the motor, the application of electricity being in response to the voltage from the source and the back emf voltage being of opposite polarities;
    detecting when the electricity applied to the motor during consecutive cycles of the electricity from the source after having been applied during other than consecutive cycles;
    calculating the elapsed time from when electricity is detected being applied to the motor during consecutive cycles; and
    stopping the step of applying electricity to the motor after a given amount of time has elapsed.

11. The method as recited in claim 10 wherein said given interval is derived form the period of time between when the brake signal commenced to substantially when the electricity was applied during consecutive cycles.

12. The method as recited in claim 10 wherein said given interval is derived from the period between a first point in time determined from when the brake signal commenced until a second point in time determined from when the electricity was applied during consecutive cycles.

* * * * *